Figure 1:
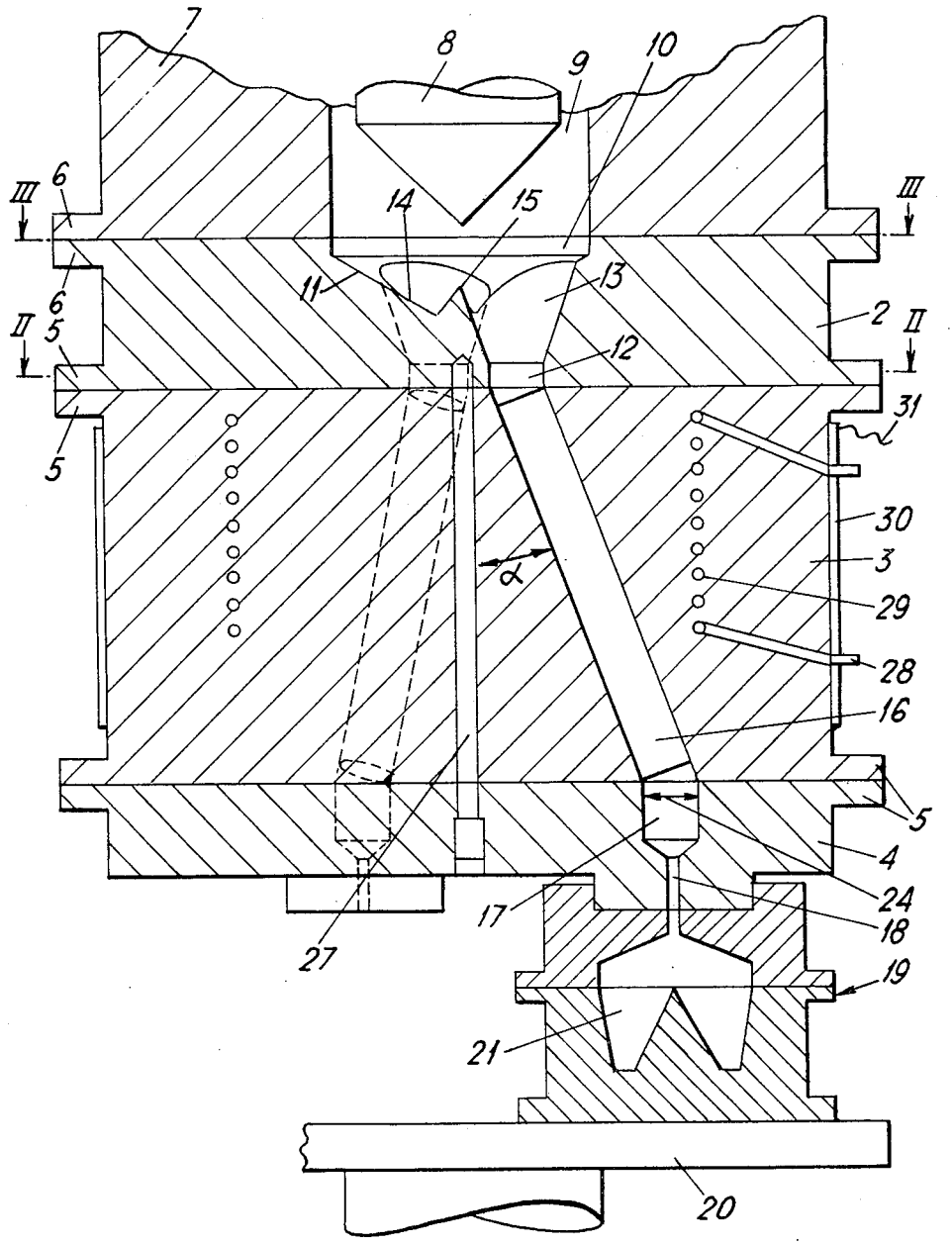

United States Patent [19]

Beyerlein et al.

[11] 3,977,820

[45] Aug. 31, 1976

[54] INJECTION MOULDING MANIFOLD

[75] Inventors: Ludwig Beyerlein, Lenzfried; Jürgen Geibel, Sankt Mang; Otto Lachner, Kempten; Manfred Langer, Boerwang-Nord, all of Germany

[73] Assignee: Lever Brothers Company, New York, N.Y.

[22] Filed: Oct. 29, 1974

[21] Appl. No.: 518,782

[30] Foreign Application Priority Data
Oct. 29, 1973 Germany............................ 2354134

[52] U.S. Cl. .............................. 425/247; 425/464
[51] Int. Cl.² ...................... B29F 1/06; B28B 13/00
[58] Field of Search ............ 425/247, 248, 464, 462, 425/468, 191, 242; 266/34 L; 222/478, 482–485; 239/548, 565, 552, 560, 553.5, 561, 132.1, 132.3, 132.5

[56] References Cited
UNITED STATES PATENTS

| | | | |
|---|---|---|---|
| 2,433,065 | 12/1947 | Rubissow | 425/242 X |
| 3,204,293 | 9/1965 | Brownson | 425/464 X |
| 3,302,882 | 2/1967 | Hutton | 239/132.3 |
| 3,304,009 | 2/1967 | Hutton | 239/132.3 |
| 3,430,939 | 3/1969 | Berry | 239/132.3 X |
| 3,551,951 | 1/1971 | Schiesser | 425/462 |
| 3,568,256 | 3/1971 | Johnson | 425/191 |
| 3,595,480 | 7/1971 | Kunioka | 239/132.3 |
| 3,750,952 | 8/1973 | Hellmuth | 239/132.3 |
| 3,758,252 | 9/1973 | Kohler | 425/247 X |

*Primary Examiner*—Francis S. Husar
*Assistant Examiner*—John S. Brown
*Attorney, Agent, or Firm*—James J. Farrell; Kenneth F. Dusyn; Melvin H. Kurtz

[57] ABSTRACT

A manifold for dividing a stream of plasticised material into a plurality of sub-streams as a main channel terminating in an inwardly tapering end wall. A plurality of sub-channels are symmetrically arranged in the inwardly tapering end wall and are provided with transition passages inwardly tapering away from the main channel, adjoining transition passages intersecting to form intersection edges havin knife like edges facing the main channel. The vertex angle of the inwardly tapering end wall and of the transition passages is less than 90° and where there are three or more sub-channels the end wall of the main channel merges substantially tangentially with the intersection edges. A manifold is particularly useful for dividing a main stream of heat sensitive plasticized material such as PVC into a plurality of sub-streams.

2 Claims, 3 Drawing Figures

INJECTION MOULDING MANIFOLD

This invention relates to an improved injection moulding manifold and particularly to a manifold for dividing a stream of plasticised material, eg thermoplastic material, into a plurality of streams.

In the injection moulding of thermoplastic material it is often desirable to divide the main stream of material from an extruder into a number of sub-streams which are then injected through injection nozzles into a number of article forming injection moulds. Of course the article forming injection moulds can be multi-impression moulds or single impression moulds.

Various proposals for the construction of such manifolds or dividers have been made which are certainly suitable for use in processing thermally stable injection moulding materials, ie materials which do not decompose at the processing temperatures. These proposals have not however proved completely successful for processing heat sensitive materials, such as PVC, for which it is important to avoid all areas in the channels through which the streams of material pass in which dead spots are formed in the flow of the stream of material, which dead spots lead to burning and thermal degradation of a heat sensitive material.

It has been proposed to provide a manifold in which a main channel is adapted at one end to be connected to the output of an extruder and at the other end is provided with a conical end wall. A number of sub-channels open into the conical end wall and are outwardly diverging with their axes parallel to the angle of the conical end wall of the main channel, ie inclined to the longitudinal axis of the main channel at an angle of one half the vertex angle of the conical end wall. Thus the plasticised material flows directly from the large main channel into the relatively small sub-channels.

According to the present invention there is provided a manifold for dividing a stream of plasticised material into a plurality of sub-streams comprising a main channel having one end adapted to be connected to the output end of an extruder and an inwardly tapering end wall at the other end, a plurality of sub-channels leading from the end wall of the main channel arranged on a common pitch circle having its center-point axially aligned with the longitudinal axis of the main channel, portions of the sub-channels adjacent the main channel each being formed as inwardly tapering transition passages inwardly tapering away from the main channel and adjacent transition passages intersecting to form sharp intersection edges facing the main channel, the transition passages and the inwardly tapering end wall of the main channel having vertex angles less than 90°. A manifold constructed in this way has particularly smooth transition of the stream of plasticised material from the main channel to the separate sub-channels free of stagnation or dead points and particularly suited to processing heat sensitive materials. Moreover the symmetrical design of the manifold provides sub-channels of equal length and hence the pressure of the material in the sub-channels is equal. This provides the possibility of readily obtaining equal injection pressures at the various injection moulds to which the sub-channels are connected. Injection nozzles can of course be provided at the ends of each of the sub-channels to feed the material directly into the injection moulds.

In order to further minimise the possibility of dead spots in the stream of plasticised material the transition passages and the inwardly tapering end wall of the main channels preferably have a vertex angle of less than 60°.

The main channels and the sub-channels can conveniently be circular in cross-section. This not only facilitates the manufacture of the manifold but also ensures a more uniform flow of material particularly at the intersection between channels of different cross-sectional areas.

Preferably at least three sub-channels are provided, the end wall of the main channels inwardly tapering towards the sub-channels to merge substantially tangentially with the intersection edges formed between adjacent transition passages of the sub-channels.

In order to further separate sub-channels from one another to obtain the required spacing between the outlets thereof according to the sizes of the moulds to be fed and hence the distance required between adjacent injection nozzles at least part of the sub-channels can be straight bores inclined at an angle $\alpha$ to the axis of the main channel, the ends of the incline bores which connect with channels align with the main channel each being formed with a conical surface having its axis parallel to the axis of the main channel and having a vertex angle of twice the angle of inclination $\alpha$ and a maximum diameter corresponding to the diameter of the adjoining channel. Forming the interconnection between two passages inclined to one another in this way avoids stagnation or degradation zones in the sub-streams.

The distance between adjacent outlets of the sub-channels is determined by both the angle of inclination $\alpha$ and the length of the inclined straight bores of the sub-channels. The angle of inclination $\alpha$ should be within the range of 5° to 45°, preferably between 15° and 30°. The angle $\alpha$ is chosen for a particular manifold having regard to the distance required between the outlets of the sub-channels and the resulting length of the inclined bore of the sub-channel. In this connection it has been found that internal capacity of each compound sub-channel between the main channel and the injection nozzles or outlet ends of the sub-channels should be at most five times, and preferably three times, the volume of each article being manufactured.

In a preferred manifold construction the axes of the transition passages are parallel with the axis of the main channel. The inclined straight bores of the sub-channels interconnect with further straight bore sub-channel portions parallel to the axis of the main channel. Thus when the axes of the injection nozzles are aligned with the axes of the outlet ends of the sub-channels each of the injection nozzles are parallel to the axis of the main channel. This greatly facilitates the relative movement required between the extruder and the injection moulds for bringing the injection nozzles into contact with the injection moulds.

The shearing effect of the intersection edges on the plasticised material can effect overheating of the intersection edges which would lead to burning of the plasticised material. To avoid this a cooling device can be provided positioned between the transition passages to cool the intersecting edges. Further cooling and heating means can be provided on the manifold situated outside of the sub-channels to respectively prevent overheating or freezing of the plasticised material in the sub-channels.

Figure 2:
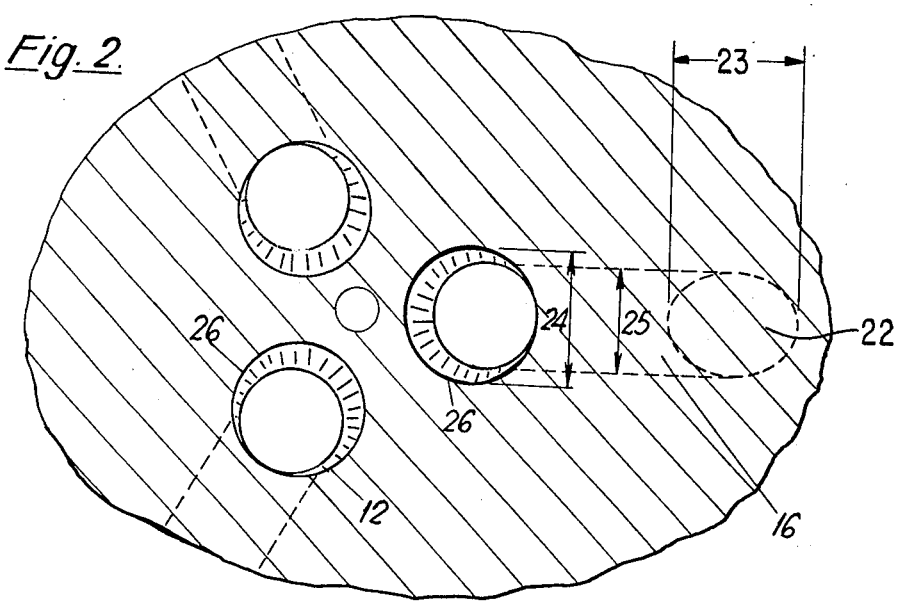
Figure 3:
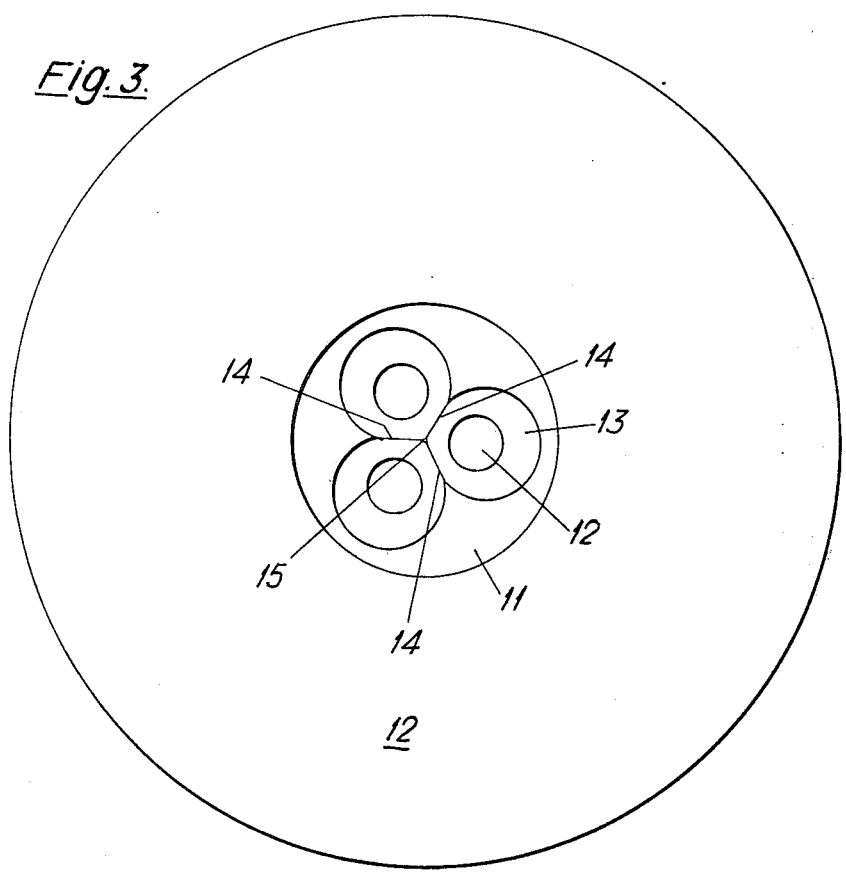

An embodiment of the invention will now be more particularly described with the reference to the accompanying diagrammatic drawings in which FIG. 1 is an axial cross-section through a manifold showing an injection device and an injection mould, FIG. 2 is a cross-section on an enlarged scale in the direction of arrows II — II in FIG. 1, and FIG. 3 is a cross-section in the direction of arrows III — III in FIG. 1.

As shown in FIG. 1 a manifold assembly comprises three plates 2, 3 and 4 which are secured together at external flanges 5. The plate 2 is similarly connected by flanges 6 to the output end of an extruder 7 having a plasticising and advancing screw 8 in a bore 9 from which a stream of thermoplastic material is extruded.

Within the plate 2 is a main channel 10 one end of which aligns with the bore 9 of the output end of the extruder. The other end of the main channel 10 is an end wall 11 which is inwardly tapering in the form of a frustum of a cone.

Three sub-channels 12 are arranged by common pitch circle as shown in FIG. 3 having their axes parallel with the axis of the main channel 10. Adjacent the end wall of the main channel the sub-channels are formed as transition passages 13 tapering inwardly from the end wall of the main channel. The transition passages 13 each intersect with adjacent transition passages forming therebetween intersection edges 14. These intersection edges 14 are knife-like edges which face the main channel 10 and in the illustrated embodiment it will be noted that the three knife edges together form a point 15 at their centre-point. The particular shape of these knife-like intersection edges will depend upon the number of sub-channels, for example when only two sub-channels are provided there will be no centre-point 15.

The vertex angle of the end wall 11 of the main channel is less than 90° and in particular it is inclined at an angle such that it merges with the intersecting knife edges so that the knife-like edges remain intact and the transition and division of the main stream of thermoplastic material into the sub-streams in the sub-channels is effected without creating any dead spots where burning of the heat sensitive material can occur. The vertex angle of the transition passages is also less than 90°, the dimensions of the transition passages being chosen so that the end wall of the main channel can merge substantially tangentially with the intersection edges formed between adjacent transition passages.

Within the plate 3 the sub-channels are formed by straight bores 16 inclined at an angle α to the axis of the main channel. These inclined bores then interconnect with further sub-channels 17 in the plate 4 from which the material flows through injection nozzles illustrated diagrammatically at 18 into injection moulds. One such injection mould is shown at 19 attached to a mould carrier 20 and as is well known the mould carrier and extruder can be separated to allow the injection moulded articles formed in the mould cavity 21 to be removed.

Referring now to FIG. 2 it can be seen how the intersection between the bores of the sub-channels 16 which are inclined at an angle α to the axis of the main channel and the parts of the sub-channels 12 and 17 which are parallel to the axis of the main channel are arranged so as to eliminate any dead spots. As can be seen in FIG. 2 the inclined bores 16 form ellipses 22 in planes at right angles to the axis of the main channel. The relative diameters of the inclined bores 16 and the parts of the sub-channels 12 and 17 are chosen such that the length of the major axis 23 of the ellipse 22 is not greater than the diameter 24 of the sub-channels 12 and 17. Expressed in another way this means that the diameter of the sub-channels 12 and 17 should be equal to or greater than the diameter of the inclined bores 16 divided by cosine α where α is the angle of inclination of the inclined bores 16 to the axis of the main channel.

To eliminate the step between the diameters of parts 12 and 17 and the minor axis 25 of the ellipse the ends of the inclined passages are formed with substantially conical surfaces 26 having axes parallel with the passages 12 and 17 and a vertex angle of twice the angle of inclination α. The conical surfaces are shaded for clarity in FIG. 2. The maximum diameter of the conical surfaces 26 is that of the diameters 24 of bores 12 and 17.

It will be appreciated that whilst the length of the major axis 23 of the ellipse 22 should not be greater than diameter 24 of passages 12 and 17, it can be smaller. In this latter event the conical surface would continue all the way round the elliptical opening 22.

The spacing between the injection nozzles 18 is largely determined by the angle α and the thickness of plate 3, the required spacing obviously being dictated by the size of the moulds to be fed. Nevertheless the angle α and thickness of plate 3 should both be kept as small as possible. This minimises both the amount of material contained at any one time in the sub-channels and also minimises the deviation of the stream of plasticised material from a straight line.

It has been found that the capacity of each of the sub-channels, ie the capacity of the channels after being divided from the main channel in plate 2 to the injection nozzles 18 in plate 4, should not exceed five times, and preferably not more than three times, the volume of the article being manufactured. The thermoplastic material then spends only a relatively short period of time in the sub-channels of the manifold so that the probability of formation of hot spots in the material is minimised.

An important feature of the manifold is that the inclined surfaces thereof which face the flow of material from the extruder are inclined more than 135° to the axis of the main channel. Thus the vertex angles of the inwardly tapering end wall 11 and the transition passages 13 are less than 90° and the angle α is less than 45°. In this way the deflection of the plasticised stream of material is kept low to ensure a satisfactory flow without dead spots. It is particularly advantageous when the inclination is more than 150°, ie when the vertex angles are less than 60° and α is less than 30°.

The efficiency of the manifold is also further enhanced by the provision of cooling and heating devices to control the temperature of the thermoplastic material within the manifold. In this respect a cooling device 27 is located centrally within the plates to extend to the region below the point 15 of the knife edges 14. At this point the shearing effect of the intersection edges on the plasticised material can cause overheating of the intersection edges which would lead to burning of the plasticised material. The cooling device can conveniently be a passage through which a cooling liquid can be passed to prevent such overheating.

Within the plate 3 there is also provided a cooling device 28 extending around the outside of the sub-channels 16. This cooling device comprises pipes 29 through which a cooling liquid or refrigerant can be passed and with such a device the temperature of the plasticised material in the sub-channels can be controlled even to the extent of cooling the material so that between individual injection moulding cycles, ie during the phase when there are no moulds attached to the injection nozzles at the ends of the compound sub-channels and there is no injection pressure from the injection moulding plant, the viscosity of the plasticised material can be adjusted to a higher value as a result of which undesirable discharge of the plasticised material from the injection nozzles is avoided.

A heating device 30 can also be provided around plate 3 as shown in FIG. 1. Such a heating device can be heated by the passage of a heating medium or electrically heated as indicated by the connecting lead 31. Such a heating device can be used to prevent the solidification or freezing of plasticised material in the sub-channels should the flow of material through the sub-channels be prevented for any undue length of time.

The manifold described above and shown in the drawings is constructed of a number of plates to facilitate the manufacture thereof. It will of course be appreciated that this construction can readily be modified according to the method of manufacture of the manifold to be employed. A particularly important construction of the manifold is that shown embodied in plate 2 in which the main channel is divided into the sub-channels. It will be noted that any rounded edges facing the direction of flow of the plasticised material are avoided since the upstream surfaces of such rounded edges have been found to give rise to dead spots in the flow of material. Also the transition from the main channel to the sub-channels is effected as gradually as possible by the divided substreams first flowing through the transition passages of the sub-channels.

What is claimed is:

1. An injection moulding manifold for dividing a main stream of thermoplastic material into a plurality of sub-streams comprising a body member defining a main channel having at one end an inlet and at the opposite end an inwardly tapering end wall, the body having attachment means to connect the body to the output end of an extruder so that the inlet of the main channel receives the main stream of plasticized material from the extruder, said body member also defining a plurality of sub-channels having at one end thereof inlet openings in the end wall of the main channel and outlet openings at the opposite ends of the sub-channels and an injection nozzle at each of the outlet openings adapted to be connected with an injection mould said inlet openings being arranged on a common pitch circle having its centre axially aligned with the main channel, portions of the sub-channels adjacent to the main channel being defined as tapering transition passages inwardly tapering away from the main channel, intersection edges between adjoining transition passages facing the main channel, said intersection edges being formed by adjacent transition passages intersecting with one another, the transition passages and the inwardly tapering end wall of the main channel having a vertex angle of less than 90°, at least part of the sub-channels being straight bores inclined at an angle $\alpha$ to the axis of the main channel, the ends of the inclined bores which connect with channels aligned with the main channel each being formed with an internal inwardly tapering chamfered surface generated by a line rotating about the axis of the sub-channel aligned with the main channel and inclined at an angle $\alpha$ thereto, the chamfered surface having a maximum diameter corresponding to the diameter of the adjoining channel.

2. A manifold according to claim 1 including injection moulds each adapted to be connected with one of the injection nozzles, each of the sub-channels having an internal volume of not more than 5 times the volume of one of the injection moulds.

* * * * *